Figure 1:
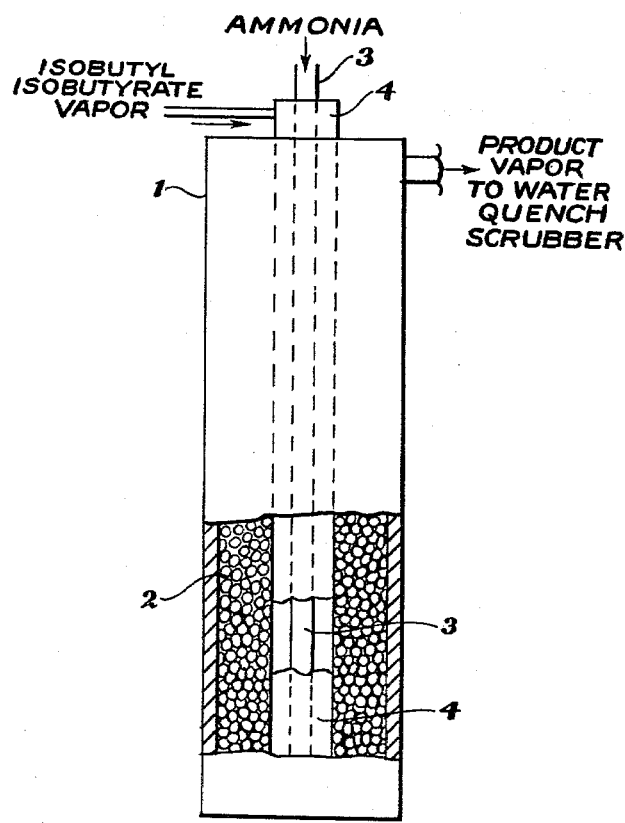

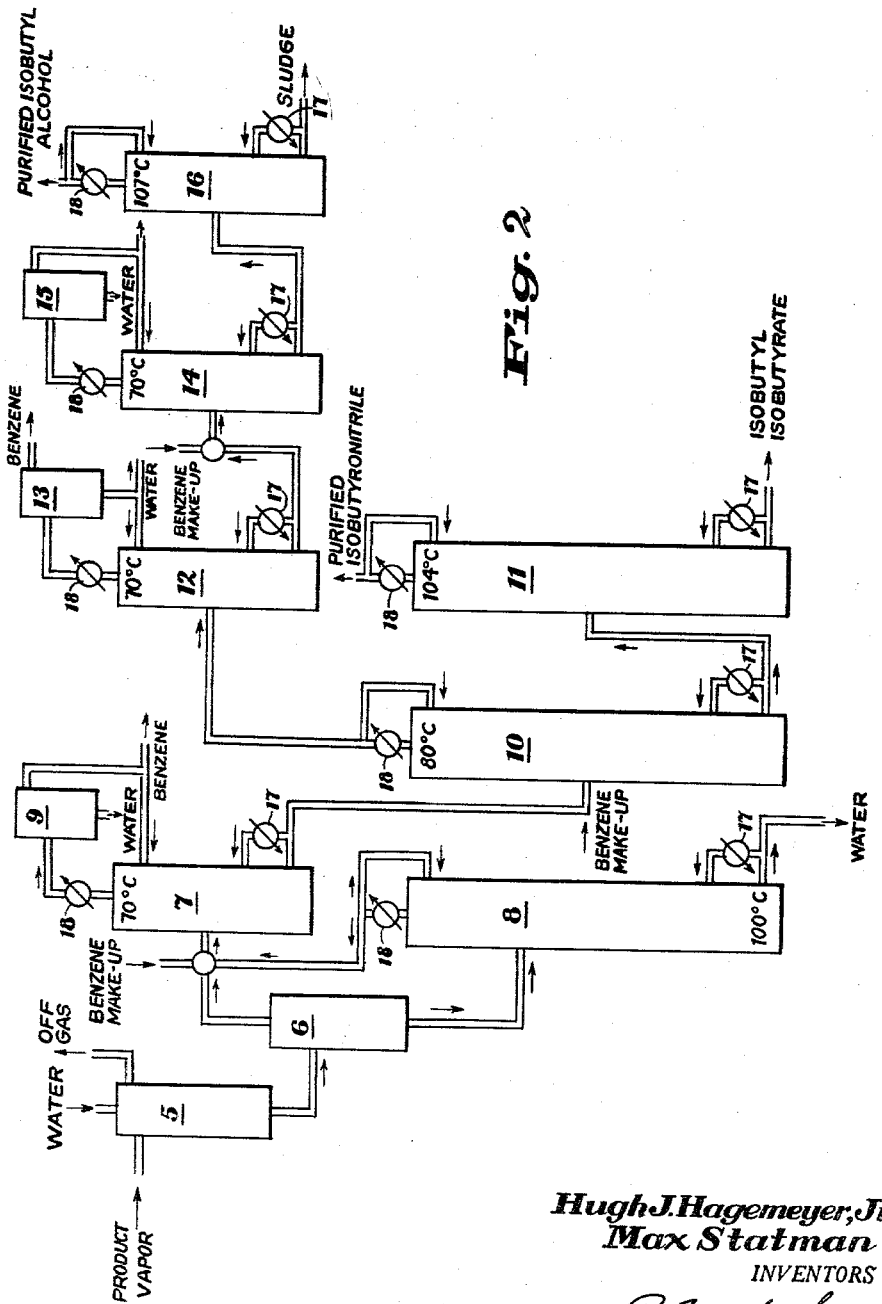

United States Patent Office 3,173,938
Patented Mar. 16, 1965

3,173,938
MANUFACTURE AND SEPARATION OF ISOBUTYRONITRILE AND ISOBUTYL ALCOHOL
Hugh J. Hagemeyer, Jr., and Max Statman, Longview, Tex., assignors to Eastman Kodak Company, Rochester, N.Y., a corporation of New Jersey
Filed Mar. 16, 1962, Ser. No. 180,203
5 Claims. (Cl. 260—465.1)

This invention relates to manufacture and purification of isobutyronitrile and isobutyl alcohol.

An object of the invention is to provide an improved process for producing isobutyl alcohol and isobutyronitrile by the reaction of isobutyl isobutyrate with ammonia in the presence of a catalyst at elevated temperature, and for separating the reaction products.

A more specific object is to provide a method for dehydrating and separating isobutyronitrile and isobutyl alcohol from the mixed reaction product obtained by the above reaction.

Isobutyl isobutyrate and ammonia, when contacted in vapor phase in the presence of a catalyst such as gamma-alumina at 350–500° C. will react to form substantial yields of isobutyronitrile and isobutyl alcohol. The reaction is conveniently carried out by passing vapors of isobutyl isobutyrate and ammonia through a heated reactor packed with pelleted gamma-alumina catalyst material at contact times ranging from 1.5 to 12 seconds, preferably about 2.5–3 seconds. The mole ratio of ammonia to isobutyl isobutyrate may range between about 0.8:1.0 and about 4:1, preferably between 0.8:1.0 and 2.5:1.0.

It is convenient to condense the reaction products in a water quench as they come from the reactor. It has been a problem to dry and separate the nitrile and alcohol reaction products from the condensed mixture. The products, isobutyronitrile and isobutyl alcohol, boil at 104° C. and 108° C., respectively, and form an azeotropic mixture boiling at 101° C., so their separation by ordinary rectification is practically impossible. With water both products form azeotropes that have close boiling points, viz. 88° C. for water-isobutyronitrile and 90° C. for water-isobutyl alcohol, so water alone is not suitable for an azeotropic separating agent. However, we have discovered that by using both water and benzene as separating agents in a series of azeotropic distillation steps as described below, the nitrile and alcohol products are effectively dried and separated.

The process of this invention has the advantage that a water quench may be used to condense the reaction product vapors and then the components of the condensed mixture can be easily separated. Other objects and advantages will appear from the following detailed description with reference to the drawings.

In the drawings, FIG. 1 shows a reactor tube with interior portions shown in cut-away view.

FIG. 2 is a schematic flow diagram illustrating a preferred method for treating product vapors from the reactor.

Referring now to FIG. 1, reference numeral 1 designates a single reactor tube packed with pelleted alumina catalyst material 2. A number of such tubes 1 may be arranged in a furnace (not shown) for maintaining the selected reaction temperature in the reactor tubes.

In a preferred embodiment of the invention isobutyl isobutyrate vapor and ammonia are fed separately at the selected mole ratio through separate tubes 3 and 4 into the reactor and are first mixed as they come in contact with the catalyst 2 in the reactor tube 1. After passing upward through the catalyst bed 2 for the selected contact time, vapors containing the reaction product as well as unreacted material and some impurities, are led from the upper end of the reactor tube 1. As shown diagrammatically in FIG. 2, vapors from the reactor tube 1 are fed into a water-quench scrubber 5 where vapors of the reaction products and unreacted isobutyl isobutyrate are condensed in a water quench. Uncondensed gases are vented overhead from the quench scrubber 5. Liquids from the bottom of the quench scrubber 5 are led to a decanter 6 where the liquids separate into aqueous and organic phases.

The organic phase from the decanter 6, rich in isobutyl alcohol and isobutyronitrile, and containing unreacted isobutyl isobutyrate and some impurities, is led directly to a crude drying column 7.

The aqueous phase from the decanter 6 is led to a steam stripper column 8 where residual organic components, principally isobutyl alcohol, are distilled overhead by steam distillation. Distillate from the steam stripper 8, containing water and organic components, is led to the crude drying column 7. Water from the bottom of the steam stripper 8 may be recycled to the quench scrubber 5.

Benzene is fed as needed to the crude drying column 7 with the organic phase from the decanter 6 and the distillate from the steam stripper 8. In the crude drying column 7 the mixture of these feeds is rectified to distill overhead substantially all of the water present as a component of the benzene-water azeotrope which boils at 70° C. Distillate from the crude drying column 7 is led to a decanter 9 where benzene and water separate. The organic phase from the decanter 9, consisting mostly of benzene, is refluxed to the top of the crude drying column 7. The water phase may be recycled to the steam stripper 8 or to the quench scrubber 5.

Bottoms from a crude drying column 7, containing substantially all of the isobutyronitrile, isobutyl alcohol, and any excess benzene as well as isobutyl isobutyrate and impurities, are fed to an isobutyl alcohol stripping column 10 from which the benzene-isobutyl alcohol azeotrope and excess benzene are removed overhead at about 80° C.

In a preferred embodiment of the invention, sufficient benzene is introduced with the feed to the crude drying column 7 to carry over at least enough benzene in bottoms from this column 7 to form an azeotropic mixture in the alcohol stripping column 10 with all of the isobutyl alcohol present, but benzene may be added as needed to the feed to the alcohol stripping column 10. Any excess benzene in the isobutyl alcohol stripper 10 will do no harm as such excess will be distilled over with and in addition to the benzene-alcohol azeotrope at about 80° C. and will be recovered at the benzene recovery column 12.

Bottoms from the alcohol stripping column 10, consisting of isobutyronitrile and isobutyl isobutyrate with some impurities, are fed to an isobutyronitrile stripper 11 in which those two components are separated by ordinary rectification, recovering isobutyronitrile overhead at 104° C. Bottoms, containing isobutyl isobutyrate can be vaporized and recycled to the reactor. Distillate from the isobutyl alcohol stripper 10 containing benzene and isobutyl alcohol is fed to a benzene recovery column 12 where water is added and the benzene-water azeotrope is removed overhead at 70° C. Distillate from the benzene recovery column 12 is led to a decanter 13 where the benzene and water separate into organic and aqueous phases. Water from the decanter 13 is refluxed to the top of the benzene recovery column 12. Bottoms from the benzene recovery column 12, containing isobutyl alcohol and any excess water not removed with the benzene, is fed to an isobutyl alcohol drying column 14, where water is removed overhead as a component of the isobutyl alcohol-water azeotrope boiling at 89.8° C. Substantially dry isobutyl alcohol is removed from the bottom of the alcohol drying column 14. Distillate from this column 14 is led to a decanter 15 where the isobutyl alcohol and water separate. Isobutyl alcohol from this decanter 15 is refluxed to the top of the isobutyl alcohol drying column 14 as needed and the aqueous phase from the decanter 15 may be recycled to the steam stripper 8 or to the water quench scrubber 5. Isobutyl alcohol from the bottom of the alcohol drying column 14 may be further refined in an isobutyl alcohol finishing column 16 in which isobutyl alcohol is removed overhead at about 108° C. Sludge consisting of impurities is removed as bottoms from this column 16.

Assuming steady on-stream operating conditions, it will be seen that the benzene reflux from the decanter 9 to the drying column 7 will be sufficient to remove all water from the feed, and any benzene added to the feed will be carried over with bottoms to the alcohol stripping column 10. Also, when needed benzene may be added to the stripping column 10 feed. In any case, it is necessary to provide at least enough benzene in the feed to the alcohol stripping column 10 to form an azeotrope with all of the alcohol in the feed. Assuming such steady operating conditions, the benzene from the decanter 13 at the head of the benzene recovery column 12 will be sufficient, except for small losses, to make up the benzene added in feeds to the drying column 7 and stripping column 10.

Still assuming such steady on-stream operating conditions, the water reflux to the benzene recovery column 12 will be sufficient to remove all benzene from that column. In practice the feed stream compositions will vary somewhat over a period of time and there will be some loss during separation so that adjustments in the rates of benzene and water addition to the respective columns will be necessary to maintain the desired separation. Benzene losses may be kept to a minimum by recycling all water and benzene recovered in the system.

The process of the invention may be carried out in equipment of conventional design operated according to the particular requirements of the process as outlined above. It will be understood that additional process equipment ordinarily used in connection with such rectification processes, but not detailed herein, such as pumps, re-boilers, condensers, level controllers, surge tanks and the like will be used in the conventional way, and some of this equipment is indicated schematically in the drawing. For instance, re-boilers 17 are provided at the bottom of the distillation columns and condensers 18 are provided at the head of each distillation column. The rectification columns may be conventional packed columns, or fractionating towers with trays, or the like, designed to effect the desired rectification.

The following example illustrates a preferred embodiment of the invention:

EXAMPLE 1

Through a reactor tube packed with 10 cu. ft. of ¼" pelleted gamma-alumina catalyst was fed a mixture of ammonia and isobutyl isobutyrate in a mole ratio of 2.2:1. Reactor temperature was maintained at 365° C. Contact time was 3 seconds. The feed rate was 18,000 pounds per day of isobutyl isobutyrate and 4,650 pounds per day of ammonia.

Product gas from the reactor was fed to a water quench scrubber and the condensed products from the scrubber were separated and refined by the process described above. Production rates were 6,000 pounds per day of isobutyronitrile and 4,800 pounds per day of isobutyl alcohol. Based on moles of isobutyl isobutyrate, this represents a conversion per pass of 84% and 62% for isobutyronitrile and isobutyl alcohol respectively. In the separation process 3,000 pounds per day of isobutyl isobutyrate was recovered, and this was recycled to the reactor; thus, the product yields based upon moles of ester reacted amounted to 91% for isobutyronitrile and 80% for isobutyl alcohol.

The water feed rate to the water quench scrubber was 20,000 pounds per day. 1500 pounds per day of distillate from the steam stripper was fed to the crude drying column, and 50,000 pounds per day of benzene was added in the feed to this same column, most of which was recycled from the benzene recovery column.

In Table I are shown the compositions of binary azeotropes formed by the components used in the process described above, and the boiling points of those mixtures and of their components.

Table I

| Component A | B.P., °C. | Component B | B.P., °C. | Wt. Percent of Component A in Azeotrope | B.P. of Azeotrope, °C. |
|---|---|---|---|---|---|
| Water | 100 | Isobutyronitrile | 104 | 23 | 82.5 |
| Do | 100 | Isobutyl Alcohol | 108 | 33.0 | 89.8 |
| Do | 100 | Benzene | 80.2 | 8.83 | 69.25 |
| Isobutyl Alcohol | 108 | do | 80.2 | 9.3 | 79.84 |

It will be understood that modifications and variations may be made within the scope of the invention as described above and as defined in the following claims.

We claim:

1. A process for simultaneously preparing isobutyronitrile and isobutyl alcohol which comprises contacting ammonia and isobutyl isobutyrate in the vapor phase in the presence of γ-alumina as a catalyst at a temperature of 350° C. to 500° C., wherein the contact time ranges from 1.5 to 12 seconds and wherein the mole ratio of ammonia to isobutyl isobutyrate ranges from about 0.8:1.0 to about 4:1.

2. A process according to claim 1 wherein the contact time ranges from 2.5 to 3 seconds.

3. A process according to claim 2 wherein the mole ratio of ammonia to isobutyl isobutyrate ranges between 0.8:1.0 and 2.5:1.0.

4. A process for separating components from the reaction product obtained in accordance with the process of claim 1, which product contains substantial amounts of isobutyronitrile and isobutyl alcohol as well as unreacted isobutyl isobutyrate, which comprises (a) condensing the reaction product vapors with water,
(b) decanting the condensed reaction product to remove excess water and to recover an organic rich phase,
(c) adding benzene to said organic rich phase in sufficient amount to form an azeotrope with all the water present in said organic rich phase upon distillation,
(d) distilling the organic rich phase to remove water therefrom as a benzene-water azeotrope and leaving a residue containing isobutyl alcohol, isobutyronitrile and isobutyl isobutyrate,
(e) adding sufficient benzene to the isobutyl alcohol residue of d to form a benzene-isobutyl alcohol azeotrope with all the isobutyl alcohol upon distillation and distilling off benzene-isobutyl alcohol azeotrope and any excess benzene leaving a residue containing isobutyronitrile and isobutyl isobutyrate, (f) adding sufficient water to the benzene-isobutyl alcohol distillate to form an azeotrope with all the benzene present in the isobutyl alcohol distillate upon distillation and distilling to remove benzene as a benzene-water azeotrope leaving a residue containing isobutyl alcohol and any excess water, and (g) distilling the isobutyl alcohol residue of f to remove any water contained therein as the isobutyl alcohol-water azeotrope, leaving a residue consisting essentially of isobutyl alcohol.

5. A process according to claim 4 wherein the isobutyronitrile, isobutyl isobuyrate residue of e is distilled to recover isobutyronitrile as the distillate.

References Cited in the file of this patent
UNITED STATES PATENTS
2,369,061    Loder et al. _____ Feb. 6, 1945

OTHER REFERENCES

"Azeotropic Data," Advances in Chemistry Series, Number 6, American Chemical Society, 1952, pages 110 and 128.